Feb. 1, 1927. 1,616,284
L. SOSDIAN
THREADING MACHINE
Filed May 8, 1925 3 Sheets-Sheet 1
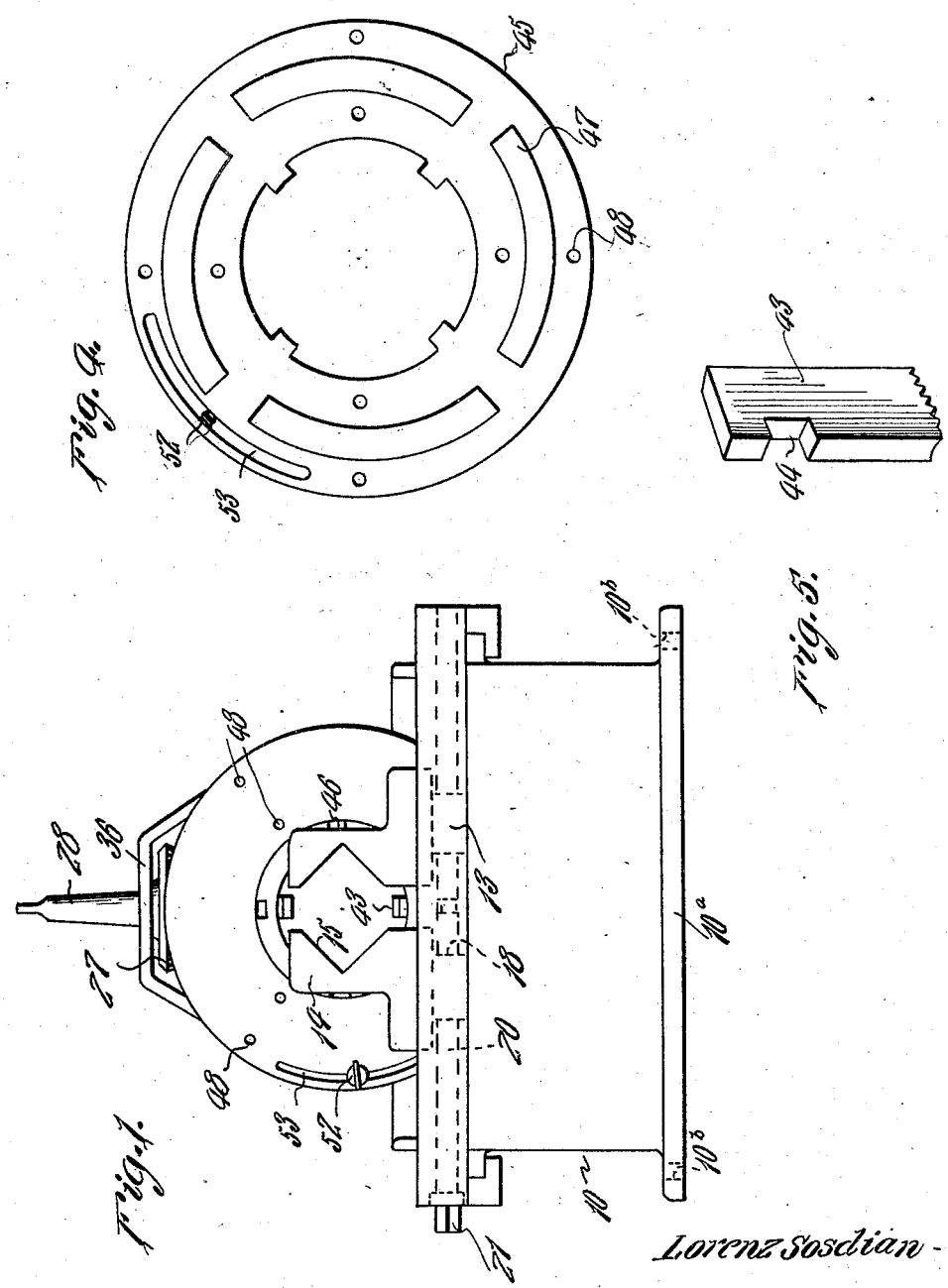
Lorenz Sosdian -
INVENTOR
BY Victor J. Evans
ATTORNEY Feb. 1, 1927.  1,616,284
L. SOSDIAN
THREADING MACHINE
Filed May 8, 1925  3 Sheets-Sheet 2
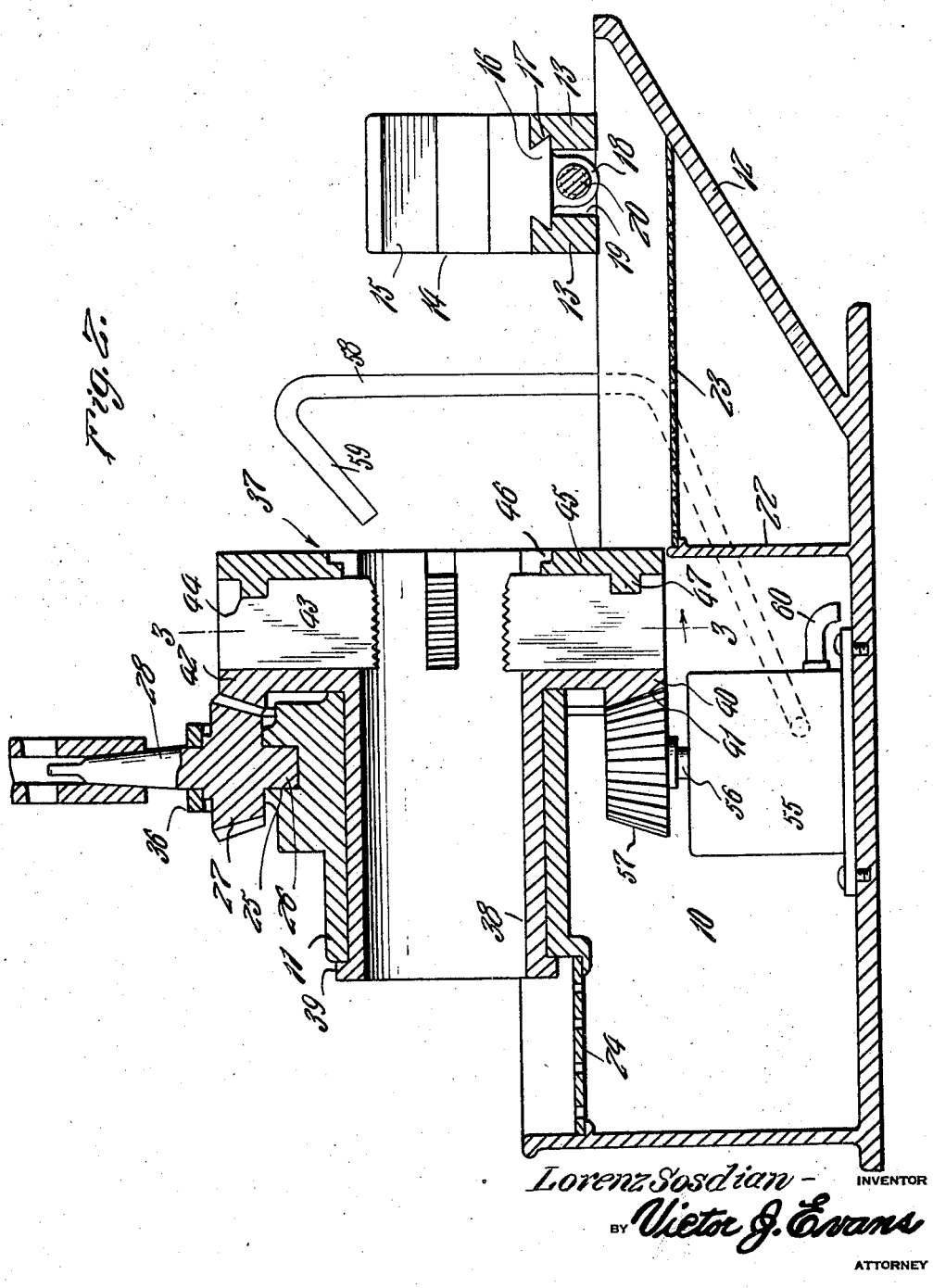

Feb. 1, 1927. 1,616,284
L. SOSDIAN
THREADING MACHINE
Filed May 8, 1925  3 Sheets-Sheet 3
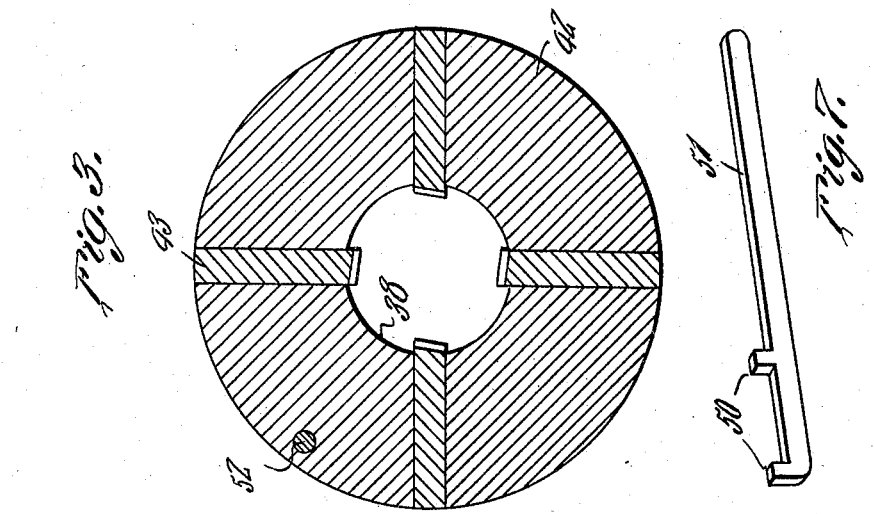
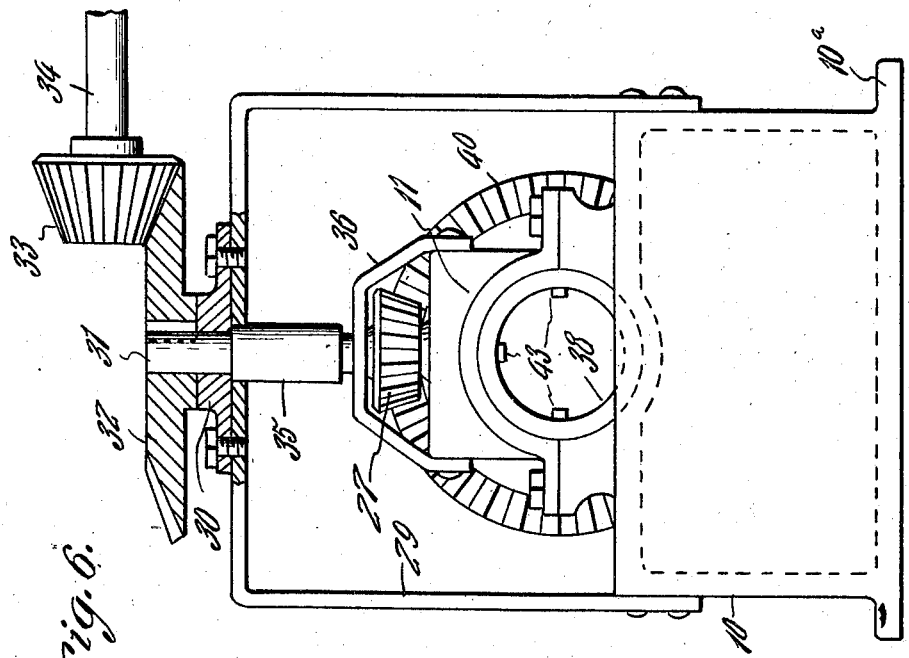
Lorenz Sosdian-
INVENTOR
BY Victor J. Evans
ATTORNEY Patented Feb. 1, 1927.

1,616,284

UNITED STATES PATENT OFFICE.

LORENZ SOSDIAN, OF BRADLEY PARK, NEW JERSEY.

THREADING MACHINE.

Application filed May 8, 1925. Serial No. 28,926.

This invention relates to threading machines and has for its object the provision of a novel device adapted to be driven by the gear mechanism of a drill press or by means of a separate source of power, such as an electric or other motor or the like, provided with means for cutting a thread upon a bolt, pipe, rod or the like in a very satisfactory and efficient manner.

An important object is the provision of a device of this character embodying a rotary chuck carrying the thread cutting elements, means being provided on the chuck whereby to adjust the extent of projection of the thread cutters.

Another object is the provision of a machine of this character embodying a vice which forms a permanent part of the machine and which is provided for the purpose of holding the work while the threading action is being carried out.

Yet another object is the provision of a machine for this purpose which embodies a peculiar and novel base and frame construction supporting the rotatable chuck which in turn carries the screw cutting element.

The invention contemplates, among other features, the provision of an apparatus of this character including various features of structural importance in point of simplicity, cheapness in manufacture, ease in adjustment and operation, and general durability.

With the above and other objects and advantages in view, the invention consists in the details of construction to be hereinafter more fully described and claimed and illustrated in the accompanying drawings in which:

Figure 1 is a front elevation of the complete device,

Figure 2 is a vertical longitudinal section therethrough,

Figure 3 is a detail section through the chuck taken on the line 3—3 of Figure 2, Figure 4 is a detail elevation looking at the inside or inner face of the screw cutting element adjusting means, Figure 5 is a detail perspective view of one of the cutting elements, Figure 6 is a rear elevation partly in section, Figure 7 is a perspective view of the tool provided for effecting adjustment of the cutters.

Referring more particularly to the drawings, I have shown a machine as comprising a base portion 10 which is preferably, though not necessarily, of rectangular shape and of hollow formation, this latter feature being partly for the sake of lightness and partly for a reason to be explained. This base member includes an intermediate bearing portion 11 and an elongated forwardly extending front portion 12 carrying transverse guides 13 upon which are slidably mounted members 14 which constitute a vise. The bottom of the base is flanged at $10^a$, the flanges having holes $10^b$ therein whereby the device may be bolted down.

The vise members 14 preferably have their confronting faces recessed as indicated at 15 in order that they will be capable of gripping a pipe, rod or other cylindrical objects as one of any other shape. The members 14 are provided at their lower portions with dovetail projections 16 within dovetail grooves 17 in the guides 13. The members 14 are also provided with projections 18 movable along the space 19 between the guides 13 and threadedly engaged by the oppositely threaded end portions of an operating rod 20 such as the screw shown. At one end, this threaded rod or screw 20 is provided with a squared extension 21 by means of which it may be turned by means of a wrench, handwheel or the like, whereby to effect adjustment of the members 14 toward or from each other.

Mounted within the base member 10 and extending between a vertical partition 22 therein and the forward end of the extension 12 is a perforated plate 23, and extending across the upper portion of the base member at the rear thereof and between the back wall and the rear end of the bearing portion 11 is a similar perforated plate 24. These plates are provided for a purpose to be described and should be capable of being taken out in order to permit access to the interior.

While the bearing portion 11 is described as being integral with the base it should be distinctly understood that such is not necessarily the case inasmuch as it might be a separate structure bolted thereonto. This and other details of a more or less similar nature are immaterial and may be varied within wide limits. The top of the bearing portion or member 11 is formed with a socket 25 within which is rotatably engaged an extension or trunnion 26 formed on a pinion 27 carried by a shaft or stub 28 of such size and shape as to be capable of engagement within the chuck of a drill press or the like.

To brace the structure, use may be made of an inverted U-shaped frame 29 which is arranged in straddling relation to the base member and suitably bolted or otherwise secured thereto. Carried by the bite portion of this frame member is a bearing 30 through which is journaled a shaft 31 having secured thereto, by any suitable means, a beveled gear 32 which may be driven by means of a pinion 33 on the shaft 34 of an electric or other motor. The shaft 31 also carries a socket member 35 adapted to be engaged upon the stub or shaft 28 when use of the external power device is desired. I also prefer to use a brace member of a frame like construction indicated at 36 which has its arms secured to the bearing member or portion 11 and which has its bight portion apertured for the passage of the stub or shaft 28.

The chuck is designated broadly by the numeral 37 and includes an elongated tubular portion 38 journaled within the bearing portion or member 11 and provided at one end with an outstanding flange 39 operating to prevent longitudinal movement in one direction. The other end of the member 38 is formed into a relatively large head 40 formed on its rear face with ring-gear teeth 41 meshing with the pinion 27. This head 40 is provided with a plurality of radial grooves or slots 42 within which are slidably, adjustably mounted thread cutters 43 each of which is formed at its outer edge with a notch or groove 44.

The adjusting and holding means for these thread cutters includes a ring or disk 45 rotatably mounted on the forward end of the member 38 and held against withdrawal by means of suitable means such as the outstanding flange 46 formed on the member 38. At its rear face, this ring or disk is provided with arcuate ribs 47 of a spiral-like arrangement fitting within the notches or grooves 44 in the thread cutting element. It is intended that this disk be rotatably adjustable with respect to the head 40 whereby the ribs thereon engaging within the notches or grooves in the thread cutters will adjust these inwardly or outwardly, as the case may be, depending upon whether the thread is just started or whether the final cutting is being accomplished. For this reason, the ring or disk is provided with a plurality of holes 48 within which may be engaged lugs 40 on a lever tool 51 which is provided for the purpose of effecting rotation of the ring or disk to make the necessary or desired adjustment.

For maintaining a desired adjusted position, use is made of a stud 52 which is threaded through or into the head and which passes through an arcuate slot 53 in the disk 45. This stud may be formed as a thumb screw or the like and it is quite obvious that after an adjusted position of the cutters has been made this stud or thumb screw should be tightened to prevent relative rotation of the disk 45 with respect to the head.

Located in the hollow base 10 is a suitable oil pump conventionally illustrated at 55, which pump has an operating shaft 56 carrying a bevel gear 57 meshing with the ring gear 41 so as to be driven whenever the chuck is rotated. Leading from this oil pump is a discharge pipe 58 which is angularly shaped and which extends upwardly to a point near the top of the chuck with its terminal downwardly directed to constitute a discharge nozzle 59 which will expel oil onto the rod, pipe or other object being cut. The above described perforated plate 23 and 24 are for the purpose of permitting the oil discharged from the nozzle 59 to pass back into the hollow base 10 where it is drawn into the oil pump through a suitable intake pipe 60. The entrance end of this intake pipe is spaced from the bottom of the chamber in which the oil accumulates in order that cuttings entering this chamber with the oil will not be drawn into the oil pump.

In the operation, it will be apparent that the rod, pipe or the like to be threaded is clamped between the vise members 14 and moved longitudinally, by any desired means, while the chuck member carrying the cutting element is rotated either by means of a drill press or the like or by means of an auxiliary or external source of power such as an electric or other motor. Obviously, the cutting element will cut the thread upon the article in a very rapid and efficient manner.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

In a machine of the character described, a pan-like supporting member, a frame structure carried by the supporting member and having a bearing, a chuck element rotatably mounted within the bearing, thread cutters carried by the chuck element, means for rotating the chuck element, perforated top elements for the pan member, a pump within the pan member, means operatively connected with the pump and the chuck member for operating the former, and a lubricant conducting pipe leading from the pump and of angular formation with its discharge end directed toward the chuck at the center thereof.

In testimony whereof I affix my signature.

LORENZ SÖSDIAN.